United States Patent
Raghunath et al.

(10) Patent No.: US 8,364,154 B1
(45) Date of Patent: Jan. 29, 2013

(54) EMPLOYING MULTIPLE MOBILE DEVICES WITH VARYING FUNCTIONAL CAPABILITIES

(75) Inventors: Mandayam Thondanur Raghunath, Bangalore (IN); Nilesh Tathawadekar, Bangalore (IN)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 12/947,044

(22) Filed: Nov. 16, 2010

(51) Int. Cl.
*H04W 40/00* (2009.01)

(52) U.S. Cl. .............. 455/445; 455/406; 455/414.1; 455/416; 455/417; 455/418; 455/435.2; 455/461; 455/463; 455/551; 455/558; 370/310.2; 370/328; 370/338; 379/156; 379/166; 379/171; 379/173; 379/177; 379/179; 379/185; 379/211.01; 379/211.02

(58) Field of Classification Search .............. 455/406, 455/414.1, 416–417, 418, 422.1, 435.1, 461, 455/463, 551, 558; 370/310.2, 328, 338; 379/156–166, 171–173, 177–179, 185, 211.01, 379/211.02
See application file for complete search history.

(56) References Cited

U.S. PATENT DOCUMENTS

| | | | |
|---|---|---|---|
| 4,677,653 A | 6/1987 | Weiner et al. | |
| 6,160,877 A * | 12/2000 | Tatchell et al. | 379/197 |
| 6,188,901 B1 | 2/2001 | Ebina | |
| 6,389,117 B1 | 5/2002 | Gross et al. | |
| 6,477,246 B1 * | 11/2002 | Dolan et al. | 379/211.02 |
| 6,501,946 B1 | 12/2002 | Farah et al. | |
| 6,526,272 B1 | 2/2003 | Bansal et al. | |
| 6,836,652 B2 | 12/2004 | Arima et al. | |
| 6,912,384 B2 | 6/2005 | Huomo et al. | |
| 7,120,240 B2 | 10/2006 | Edge et al. | |
| 7,466,978 B1 * | 12/2008 | Chapman et al. | 455/422.1 |
| 7,769,392 B2 | 8/2010 | Russell | |
| 7,778,668 B2 | 8/2010 | Miyauchi | |
| 2006/0018270 A1 * | 1/2006 | Forand et al. | 370/324 |
| 2006/0234693 A1 | 10/2006 | Isidore et al. | |
| 2010/0267374 A1 * | 10/2010 | Armstrong et al. | 455/417 |

OTHER PUBLICATIONS

Office Action from U.S. Appl. No. 13/250,924, dated Dec. 13, 2011, 13 pp.
Response to Office Action dated Dec. 13, 2011, from U.S. Appl. No. 13/250,924, filed Mar. 13, 2012, 10 pp.
Response to Office Action dated Mar. 22, 2012, from U.S. Appl. No. 13/250,924, filed May 22, 2012, 7 pp.
Office Action from U.S. Appl. No. 13/250,924, dated Mar. 22, 2012, 16 pp.

* cited by examiner

*Primary Examiner* — Steve D Agosta
(74) *Attorney, Agent, or Firm* — Shumaker & Sieffert, P.A.

(57) ABSTRACT

Communications over a network are selectively routed to one of multiple mobile devices identified by the same mobile device number. In one example, a method includes identifying a first mobile phone associated with a first activation priority by a phone number and identifying a second mobile phone associated with a second activation priority by the same phone number. The activation priority indicates a priority with which the first and the second mobile phones are activated for communications on a network. Communications associated with the phone number are selectively routed to one of the first mobile phone or the second mobile phone having a highest activation priority. The phone number defines an address at which the communications are routed to the one of the first mobile phone or the second mobile phone having the highest activation priority without being routed to an intervening address defined by another device number.

17 Claims, 5 Drawing Sheets

EMPLOYING MULTIPLE MOBILE DEVICES WITH VARYING FUNCTIONAL CAPABILITIES

TECHNICAL FIELD

This disclosure relates to mobile devices.

BACKGROUND

Mobile devices provide the benefit of being portable while allowing a user to perform a variety of functions including various forms of communication and computing. For example, some mobile devices are capable of accessing the Internet, executing gaming applications, playing videos and music, as well as providing functionality of a traditional mobile, e.g. cellular, phone. As mobile devices are not tethered to a physical communication medium or stationary power source, such devices are generally powered by a rechargeable battery. A persistent challenge in mobile device design is increasing the length of time the device may operate without recharging the battery.

One consequence of exhausting a mobile device battery is loss of communications. For example, mobile telephone users whose phone battery is depleted become unreachable by phone and, e.g., text message via a Short Message Service (SMS). One way in which accessibility has been increased is by employing forwarding services by which calls to one telephone number are automatically forwarded to one or more other phone numbers associated with other phone devices. The forwarding phone number may be tied to a user's device, e.g. a user's mobile phone, or the phone number may only serve as a starting point for the forwarding service. The forwarding phone number may be associated with multiple mobile devices owned by the same user. In any case, the user employs multiple phone devices, each of which is identified by a unique telephone number, but the forwarding service makes the user accessible at the multiple numbers via the multiple phones from a single telephone number.

Another technique that has been employed to increase user accessibility via mobile or other communications devices is associating multiple phone numbers with a single device. For example, a user's mobile phone may have a local phone number for people that can call the user from another phone number in the same area code and a toll-free, e.g. 1-800 number for people that call the user from outside of the area code.

Another technique employed for user accessibility includes telephone service providers providing multiple lines associated with one board number. Incoming calls to the one number are routed to one of many devices that can be answered by one of many telephone operators. Outgoing calls from the phone bank may be identified to outside systems by the one board number. Such configurations, however, are implemented in traditional fixed telephone systems versus mobile phone systems, e.g. cellular telephone systems.

SUMMARY

This disclosure includes techniques for selectively routing communications over a network to one of multiple mobile devices identified by the same mobile device number. In one example, a method includes identifying a plurality of mobile devices by one device number and selectively routing communications associated with the one device number to one of the mobile devices having a highest activation priority. Each of the mobile devices is associated with an activation priority that indicates a priority with which the respective mobile device is activated for communications on a network. The one device number defines an address at which the communications are routed to the one of the mobile devices having the highest activation priority without being routed to an intervening address defined by another device number.

In another example, a computer-readable storage medium includes instructions for causing a programmable processor to identify a plurality of mobile devices with one device number and selectively route communications associated with the one device number to one of the mobile devices having a highest activation priority. Each of the mobile devices is associated with an activation priority that indicates a priority with which the respective mobile device is activated for communications on a network. The one device number defines an address at which the communications are routed to the one of the mobile devices having the highest activation priority without being routed to an intervening address defined by another device number.

In another example, a method includes identifying a first mobile phone associated with a first activation priority by a phone number, identifying a second mobile phone associated with a second activation priority by the phone number, and selectively routing communications associated with the phone number to one of the first mobile phone or the second mobile phone having a highest activation priority. Activation priority indicates a priority with which the first and the second mobile phones are activated for communications on a network. The phone number defines an address at which the communications are routed to the one of the first mobile phone or the second mobile phone having the highest activation priority without being routed to an intervening address defined by another device number.

In another example, a system includes a processor and computer-readable storage medium. The computer-readable storage medium stores instructions for causing the processor to identify a plurality of mobile devices by one device number. Each of the mobile devices is associated with an activation priority that indicates a priority with which the respective mobile device is activated for communications on a network. The instructions also cause the processor to selectively route communications associated with the one device number to one of the mobile devices having a highest activation priority. The one device number defines an address at which the communications are routed to the one of the mobile devices having the highest activation priority without being routed to an intervening address defined by another device number.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
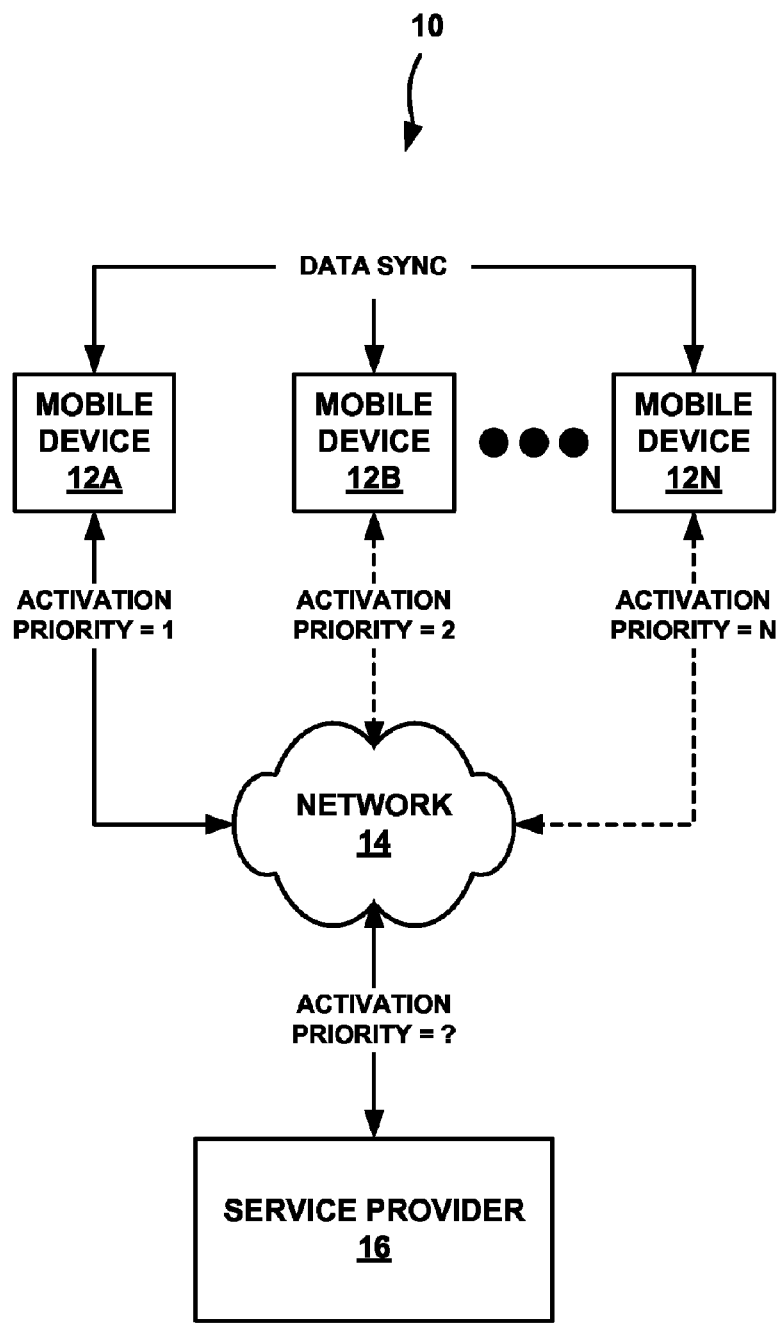
FIG. 1 is a block diagram illustrating an example system that may be used to selectively route communications to one of multiple mobile devices.

A persistent challenge in mobile device design is the length of time the device may operate without recharging the battery, which is generally referred to in this disclosure as battery life. While in some examples battery life refers to a period of time between completely charging and discharging a battery of a mobile device, more generally, battery life refers to any amount of charge level depletion of a mobile device battery. The battery life of a mobile device depends on many factors. Generally speaking, battery life is affected by loads on the battery caused by using either software or hardware components of the mobile device. As different components, including hardware and software components, draw different amounts of power, the load on the battery may vary according to component usage patterns.

Users are migrating in higher numbers to higher-end mobile phones and other mobile devices that offer superior features, including, e.g., larger and brighter displays, web access, maps and navigation, GPS support, high resolution cameras, and an increased number of and more advanced software applications. While the higher end feature phones offer greater capabilities, they typically have much lower battery life and need to be recharged often. When the battery is low the phone typically turns off all wireless connections making the phone, e.g., inaccessible to incoming phone calls.

When users switch from using a basic phone to a feature phone they gain the advantages of the feature phone such as web access, email and calendar synchronization, maps, and other applications on their phone, but they may have to sacrifice the convenience of not having to worry about recharging frequently. Basic phone batteries tend to last longer, e.g. a week with normal use or two weeks if use is sporadic, as the phone is on standby most of the time and also uses relatively little power for display and processing. Feature phones, on the other hand, consume more energy because the phones can do more and users also use the phones for more tasks. Feature phones may need to be recharged once a day, or, in some cases, once in less than a typical work-day of 10-12 hours.

When a user's phone battery dies they may not be able to receive incoming calls or make outgoing calls. The user may also not be able to communicate text messages over an SMS.

This disclosure is therefore directed to techniques that include identifying a number of mobile devices by one device number. Each of the mobile devices includes an activation priority. Communications are selectively routed to the mobile device with the highest activation priority. In addition to increasing accessibility by allowing users to seamlessly employ multiple mobile devices with varying activation priorities, the disclosed techniques also preserve services commonly delivered with mobile devices, including, e.g. preserving proper functioning of caller identification services because all of the mobile devices are identified by the same mobile device number.

In one example, the disclosed techniques are directed to using a basic phone, i.e., one with longer battery life and reduced functionality along with a feature phone, referred to below as a "smart phone," in a manner that a user is still accessible even when the battery of the smart phone is depleted or exhausted. The smart phone and basic phone are identified by the same phone number and calling plan, with the basic phone configured as lower in priority compared to the feature phone. The mobile phone network routes calls to the basic phone when the feature phone's battery is exhausted and it deregisters itself from the cellular telephone network.

As used herein, the term "smart phone" refers to a mobile telephone with a relatively large set of functionality in addition to basic telephone features like making and receiving telephone calls and sending and receiving text messages, and basic address book and other ancillary functions. For example, in addition to basic mobile phone features, a smart phone may include web and e-mail access, calendar, a Global Positioning System (GPS), mapping, as well as a number of productivity and entertainment third-party applications. The smart phone may also include additional or more advanced hardware features than the basic phone, including, e.g., a larger display screen with higher resolution and touch-screen functionality, more memory, and a digital camera. In the disclosed examples including a smart phone and a basic phone, the smart phone may include more functions and less battery life than the basic phone.

FIG. 1 is a block diagram illustrating example system 10 including mobile devices 12A-12N (collectively "mobile devices 12"), network 14, and service provider 16. Mobile devices 12 are communicatively connected to service provider 16 via network 14. Mobile devices 12 and service provider 16 are configured to periodically communicate with one another over network 14 to selectively route communications to the one of mobile devices 12 on the network with the highest activation priority.

Mobile devices 12 may include any number of different portable electronic mobile devices, including, e.g., cellular phones, personal digital assistants (PDAs), laptop computers, portable gaming devices, portable media players, e-book readers, watches, as well as non-portable devices such as desktop computers. In one example, as described in more detail with reference to FIG. 2, mobile devices 12 include a smart mobile phone and a basic mobile phone, both of which are identified by the same phone number.

Network 14 may include one or more terrestrial and/or satellite networks interconnected to provide a means of communicatively connecting mobile devices 12 to service provider 16. For example, network 14 may be a private or public local area network (LAN) or Wide Area Network (WANs). Network 14 may include both wired and wireless communications according to one or more standards and/or via one or more transport mediums. For example, network 14 may include wireless communications according to one of the 802.11 or Bluetooth specification sets, or another standard or proprietary wireless communication protocol. Network 14 may also include communications over a terrestrial cellular network, including, e.g. a GSM (Global System for Mobile Communications), CDMA (Code Division Multiple Access), EDGE (Enhanced Data for Global Evolution) network. Data transmitted over network 14, e.g., from mobile devices 12 to service provider 16 may be formatted in accordance with a variety of different communications protocols. For example, all or a portion of network 14 may be a packet-based, Internet Protocol (IP) network that communicates data from mobile devices 12 to service provider 16 in Transmission Control Protocol/Internet Protocol (TCP/IP) packets, over, e.g., Category 5, Ethernet cables.

Service provider 16 may include a variety of types of mobile device service providers, including, e.g., cellular telephone service providers like AT&T, Verizon, and Sprint. Service provider 16 in FIG. 1 represents not only the entity or entities that provide service to users of mobile devices 12, but also the computing and networking infrastructure of such entities. As such, service provider 16 may include data and communications infrastructure suited for managing the transmission of data and voice communications to and from mobile devices 12 over network 14.

For example, service provider 16 may include one or more servers configured to manage communications for mobile devices 12 over network 14. The server or servers employed by service provider 16 may be any of several different types of network devices, including, e.g., data processing appliances, web or application servers, specialized media servers, personal computers operating in a peer-to-peer fashion, or another type of network device. The configuration of the infrastructure of service provider 16 may vary. For example, the servers employed by service provider 16 may include a number of collocated or distributed servers configured to process communications to and from mobile devices 12.

In addition to servers or other computer processing devices, service provider 16 may employ data repositories, which may be implemented in software, hardware, and combinations of both. For example, a data repository of service provider 16 may include proprietary database software stored on one of a variety of storage mediums on a data storage server connected to network 14. Storage medium included in or employed in cooperation with a data repository of service provider 16 may include, e.g., any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

In some examples, mobile devices 12, in order to communicate over network 14, are registered on the network by service provider 16. Service provider 16 may, e.g., register each of mobile devices 12 on network 14 by, among other criteria, identifying the devices by one or more mobile device numbers. The mobile device number(s) by which mobile devices 12 are identified may be, e.g., a cellular telephone number or other unique number that may be tied to the devices. For example, one or more of mobile devices 12 may be identified by an International Mobile Subscriber Identity (IMSI), which is a unique number associated with GSM network mobile device users. In examples according to this disclosure, mobile devices 12 are identified by a single mobile device number. As such, in one example, service provider 16 registers mobile devices 12 on network 14 and identifies all of the devices by one mobile device number.

The one device number by which service provider 16 identifies mobile devices 12 defines an address at which communications are routed to the one of the mobile devices having the highest activation priority without being routed to an intervening address defined by another device number. In other words, the mobile device number by which mobile devices 12 are identified in examples according to this disclosure is not a forwarding or other communication routing number, which may be associated with a mobile device or devices but which does not actually define an address at which communications are routed to one of the associated devices.

Each of mobile devices 12 has an activation priority. Activation priority refers to a number, letter, alphanumeric, or other code that indicates the priority with which a particular one of multiple mobile devices should be activated for communications on a mobile device network. In example system 10 of FIG. 1, the activation priorities of mobile devices 12 indicate the priority with which communications associated with a particular device number should be routed to one of mobile devices 12 on network 14.

As illustrated in FIG. 1, in one example, mobile device 12A includes an activation priority equal to 1, mobile device 12B includes an activation priority equal to 2, and so forth up to mobile device 12N with an activation priority equal to N, where a lower number corresponds to a higher priority such that the highest possible activation priority equals 1. In another example, however, a lower number may correspond to a lower priority such that the lowest possible activation priority may equal 1. In any event, service provider 16 may selectively route communications to the one of mobile devices 12 registered on network 14 with the highest activation priority. As such, although all of mobile devices 12 are identified by one device number, service provider 16 selectively routes communications to only one of the mobile devices by discriminating between the devices based on activation priority. In the example of FIG. 1, all of mobile devices 12 are registered on network 14 by service provider 16, as indicated by both the solid and dashed communication lines in FIG. 1. However, service provider 16 routes communications over network 14 only to mobile device 12A, as indicated by the solid communication line between device 12A and network 14, because service provider 16 queries and mobile device 12A returns the highest activation priority of mobile devices 12 registered on network 14.

In another example, mobile device 12A is not registered on or becomes deregistered from network 14 for some reason, e.g. because the battery life of a battery of device 12A is depleted or exhausted or because a user powers device 12A off. In this example, service provider 16 may thereafter route communications associated with the mobile device number to mobile device 12B, which includes the highest activation priority of mobile devices 12 still registered on network 14.

In addition to the foregoing examples in which service provider 16 routes communications associated with one mobile device number to the one of mobile devices 12 with the highest activation priority, mobile devices 12 may also be configured to synchronize data between one another. Synchronization between two or more of mobile devices 12 may be accomplished via network 14, as well as a local communication medium, including, e.g. infrared communications, Bluetooth, or a wired connection, e.g. a Universal Serial Bus (USB) connection between two of the devices. Data synchronization between mobile devices 12 may function to maintain data consistency between the different mobile devices such that changes made to data on one device are transmitted to and resolved with data on the other devices employed by a user. For example, mobile devices 12 may be configured to synchronize contacts, calendar, text messaging, e-mail, voice mail, and/or phone call data between one another. Because different ones of mobile devices 12 may include different capabilities, e.g. processing and/or memory capacity, data synchronization between the devices may be based on, e.g., memory capacity, processing power, or display capabilities of each of the mobile devices.

Figure 2:
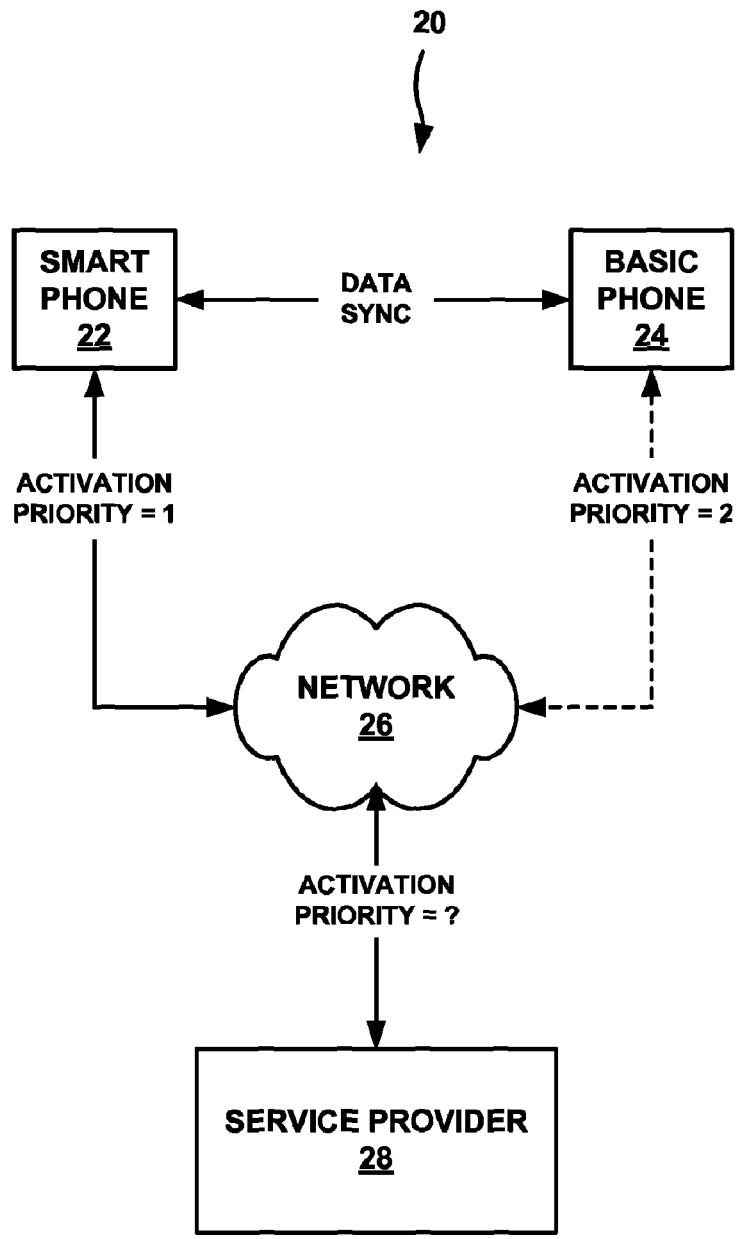
FIG. 2 is a block diagram illustrating an example system that may be used to selectively route communications to one of a smart mobile phone or a basic mobile phone.

FIG. 2 is a block diagram illustrating example system 20 including smart mobile phone 22, basic mobile phone 24, network 26, and service provider 28. FIG. 2 is one example implementation of the system of FIG. 1 in which mobile devices 12 are two cellular telephones with different feature sets. Smart phone 22 and basic phone 24 are communicatively connected to service provider 28 via network 26. Smart phone 22 and basic phone 24 and service provider 28 are configured to periodically communicate with one another over network 26 to selectively route communications associated with a single mobile phone number to the one of smart phone 22 and basic phone 24 with the highest activation priority. The remaining examples disclosed with reference to FIGS. 2-5 are described in the context of a system including a smart mobile phone and a basic mobile phone identified by one mobile phone number. However, the functions disclosed in these examples are equally applicable to systems including other types of mobile devices identified by one mobile device number, such as system 10 of FIG. 1.

Smart phone 22 may be a mobile telephone with a relatively large set of functionality in addition and compared to basic telephone features of basic phone 24 like making and receiving telephone calls and sending and receiving text messages, as well as basic address book and other ancillary functions. For example, in addition to the basic mobile phone features of basic phone 24, smart phone 26 may include web and e-mail access, calendar, a Global Positioning System (GPS), mapping, as well as a number of productivity and entertainment third-party applications. Smart phone 22 may also include additional or more advanced hardware features than basic phone 24, including, e.g., a larger display screen with higher resolution and touch-screen functionality, more memory, and a digital camera. In the disclosed examples including smart phone 22 and basic phone 24, the smart phone may include more functions and less battery life than the basic phone.

In example system 20 of FIG. 2, network 26 may include a terrestrial cellular network, including, e.g. a GSM (Global System for Mobile Communications), CDMA (Code Division Multiple Access), EDGE (Enhanced Data for Global Evolution) network. Elements of network 26 may also include additional terrestrial and/or satellite networks interconnected to provide a means of communicatively connecting smart phone 22 and basic phone 24 to service provider 28. For example, network 26 may be a private or public local area network (LAN) or Wide Area Network (WANs). Network 26 may include both wired and wireless communications according to one or more standards and/or via one or more transport mediums. For example, network 26 may include wireless communications according to one of the 802.11 or Bluetooth specification sets, or another standard or proprietary wireless communication protocol. Data transmitted over network 26, e.g., from smart phone 22 or basic phone 24 to service provider 28 may be formatted in accordance with a variety of different communications protocols.

Service provider 28 may include any of a number of private or public cellular telephone service providers like AT&T, Verizon, and Sprint. Service provider 28 in system 20 of FIG. 2 represents not only the entity or entities that provide cellular telephone service to users of smart phone 22 and basic phone 24, but also the computing and networking infrastructure of such entities. As such, service provider 28 may include data and communications infrastructure suited for managing the transmission of data and voice communications to and from smart phone 22 and basic phone 24 over network 26. The infrastructure employed by service provider 28 may be similar to that described with reference to service provider 16 in example system 10 of FIG. 1.

In one example, smart phone 22 and basic phone 24, in order to communicate over network 26, are registered on the network by service provider 28. Service provider 28 may, e.g., register smart phone 22 and basic phone 24 on network 26 by, among other criteria, identifying the devices by one mobile telephone number. Upon being powered on, smart phone 22 and basic phone 24 communicate over network 26 with service provider 28. In particular, smart phone 22 and basic phone 24 communicate with service provider 28 via a particular cellular tower of network 26 near the location of the smart and basic phones. In order to make contact with the nearest cellular tower on network 26, smart phone 22 and basic phone 24 may employ a paging or control channel. The name of this channel, and the exact manner in which it functions may vary from one cellular standard to the next, but it is a channel by which a mobile phone may indicate its presence on a service provider network. The message sent to the local cellular tower is often called the "attach" message. Once smart phone 22 and basic phone 24 send an attach message to the nearest tower of network 26, the devices may proceed with requesting registration on the network from and being accepted by service provider 28.

Service provider 28 may maintain and manage a register or database of mobile phones that are allowed to register on network 26. Additionally, mobile phone register may be maintained by service provider 28 to manage call plans and associated billing and invoicing functions. In one example, service provider 28 may include an Authentication Centre (AUC) that functions to manage registration of mobile phones on network 26. The AUC may be a device, usually located in the Home Location Register (HLR) of a GSM cellular system, to authenticate each mobile phone that attempts to connect to the GSM core network (typically when the phone is powered on). Smart phone 22 and basic phone 24 may communicate with the AUC of service provider 28, which, in turn, cross references the smart and basic phones with the mobile phone register (e.g. HLR) and based thereon accepts or declines the request to be registered on network 26. An encryption key may also be generated by the AUC, which may be subsequently used to encrypt some or all wireless communications (voice, SMS, etc.) between smart phone 22 and basic phone 24 and service provider 28. During registration, smart phone 22 and basic phone 24 communicate geographical location, and, in particular, the nearest cellular tower by which they are communicating with service provider 28. Service provider 28 stores the registration and location of smart phone 22 and basic phone 24 on network 26. When one or both of smart phone 22 and basic phone 24 are powered off or otherwise commanded to do so, the device may transmit a detach message to service provider 28 to deregister from network 26.

Periodically, smart phone 22 and basic phone 24 may, whether actively being used by a user or sitting idle, communicate with service provider 28 over network 26 to update geographical location and check on communications associated with the mobile phone number by which both devices are identified. Additionally, as smart phone 22 and basic phone 24 change geographical location, the devices may communicate location information to service provider 28. As such, when a telephone call or other communication associated with the mobile phone number of smart phone 22 and basic phone 24 is received by service provider 28, the service provider may roughly locate the devices and request that all cellular towers within some distance of this location to attempt to communicate with the smart phone and the basic phone. After locating the correct cellular tower, service provider 28 may route the communication to one of smart phone 22 or basic phone 24.

Additionally, periodically, smart phone 22 and basic phone 24 may, whether actively being used by a user or sitting idle, communicate with service provider 28 over network 26 to inform the service provider that the devices are still active, e.g. by sending "I am alive" signals to the service provider. Service provider 28 may deregister smart phone 22 or basic phone 24 from network 26 based on an explicit message from the phone, say when a user shuts the phone down or implicitly by the phone not sending an "I am alive" signal to the network. The latter may occur, e.g., when the battery of smart phone 22 or basic phone 24 dies suddenly or the phone goes out of range of network 26 or is otherwise powered off. In one example, network 26 may have a timeout limit such that if smart phone 22 or basic phone 24 does not communicate with the network within the timeout limit the network may automatically deregister the phone.

Each of smart phone 22 and basic phone 24 includes an activation priority. Activation priority refers to a number, letter, alphanumeric, or other code that indicates the priority with which a particular one of multiple mobile devices should be activated for communications on a mobile device network. In example system 20 of FIG. 2, the activation priorities of smart phone 22 and basic phone 24 indicate the priority with which communications associated with the phone number by which the smart phone and basic phone are identified should be routed to one of the two mobile phones.

As shown in FIG. 2, in one example, smart phone 22 includes an activation priority equal to 1 and basic phone includes an activation priority equal to 2, where a lower number corresponds to a higher priority such that the highest possible activation priority equals 1. In another example, however, a lower number may correspond to a lower priority such that the lowest possible activation priority may equal 1. In any event, service provider 28 may selectively route communications to the one of smart phone 22 and basic phone 24 registered on network 26 with the highest activation priority. As such, although both smart phone 22 and basic phone 24 are identified by one phone number, service provider 28 selectively routes communications to only one of the mobile phones by discriminating between the devices based on activation priority. In the example of FIG. 2, both smart phone 22 and basic phone 24 are registered on network 26 by service provider 28, as indicated by both the solid and dashed communication lines in FIG. 2. However, service provider 28 routes communications over network 26 only to smart phone 22, as indicated by the solid communication line between smart phone 22 and network 26, because service provider 28 queries and smart phone 22 returns the highest activation priority of the user's phones registered on network 26.

As with the example of FIG. 1, the one telephone number by which service provider 28 identifies both smart phone 22 and basic phone 24 defines an address at which communications are routed to the one of the smart or basic phone having the highest activation priority without being routed to an intervening address defined by another device number. In other words, the telephone number by which, both smart phone 22 and basic phone 24 are identified in examples according to this disclosure is not a forwarding or other communication routing number, which may be associated with a mobile phone or a number of phones but which does not actually define an address at which communications are routed to one of the associated devices.

In one example, a user of smart phone 22 and basic phone 24 employs the basic phone as a back-up device to the smart phone when the battery of the smart phone becomes depleted or exhausted. In such an example, smart phone 22 and basic phone 24 may be registered on network 26 simultaneously, in which case service provider will route communications associated with the phone number of smart phone 22 and basic phone 24 to the smart phone. However, upon exhaustion of battery life and the resulting powering off of smart phone 22, the phone deregisters from network 26, after which service provider 28 will automatically route communications to the user's back-up phone, i.e. basic phone 24. In another example, instead of waiting until the battery of smart phone 22 is completely exhausted, the phone may be configured to deregister from network 26 when the battery life of the battery falls below a threshold, e.g. 10% remaining battery life.

In another example, a user may employ basic phone 24 as a loaner device for other users. A parent may own both smart phone 22 and basic phone 24, which are both identified by the same phone number. The parent may also wish to allow a child to use to use a mobile phone for a limited period of time, e.g. for a weekend vacation away from home. However, the parent may not wish to purchase the child a separate phone or calling plan. Additionally, the parent may not wish to allow the child to use the more expensive and feature rich smart phone 22. As such, the parent may turn off smart phone 22, thereby deregistering the phone from network 26, and loan basic phone 24 to the child for the weekend.

In addition to deregistering one of smart phone 22 or basic phone 24 from network 26 by powering down the phone or based on battery life, the priority with which service provider 28 selectively routes communications to the smart or the basic phone may be manipulated in other ways. For example, a user may manually configure and periodically change the activation priority of smart phone 22 and basic phone 24. In the example of a parent loaning basic phone 24 to a child, the parent may temporarily change the activation priority of basic phone to 1 and of smart phone 22 to 2, but keep the smart phone registered on network 26 as a back-up in the event the child loses, damages, or otherwise renders the basic phone inactive. Smart phone 22 may even remain active to a degree on network 26 without receiving communications. For example, smart phone 22 may notify, e.g. via a pop-up message and/or an audible alert, the parent of incoming communications that is being routed to basic phone 24 over network 26 by service provider 28.

As noted above, periodically, smart phone 22 and basic phone 24 may, whether actively being used by a user or sitting idle, communicate with service provider 28 over network 26 to inform the service provider that the devices are still active, e.g. by sending "I am alive" signals to the service provider. In one example, service provider 28 may attempt to route the call to the one of smart phone 22 or basic phone 24 with the highest activation priority and that is currently registered but has died since the last "I am alive" message was sent over network 26. In such a case, upon not receiving a confirmation of call acceptance from the one of smart phone 22 or basic phone 24 with the highest activation, service provider 28 may deregister that phone and route the call to the next lower priority phone, e.g. deregister smart phone 22 and route the call to basic phone 24. This example may occur, e.g., if smart phone 22 died and a call is made to the phone over network 26 before a network timeout limit is reached for deregistering the phone.

In one example, service provider 28 may permit both smart phone 22 and basic phone 24 to transmit outgoing communications regardless of activation priority. For example, service provider 28 may permit both smart phone 22 and basic phone 24, registered on network 26 to make outgoing phone calls regardless of the activation priority of each phone. In such an example, when an outgoing call is made by a phone that does not have the highest activation priority of the phones registered on network 26, e.g. basic phone 24 in the example of FIG. 2, the caller identification may still identify itself as the phone number by which both smart phone 22 and basic phone 24 are identified. Additionally, for the duration of the outgoing call by basic phone 24, service provider 28 may behave as if smart phone 22 is deregistered from network 26. In other words, for the duration of the outgoing call by basic phone 24, if an incoming call is received, service provider 28 may route the call to basic phone 24 instead of smart phone 22.

In the foregoing examples and as illustrated in FIG. 2, the process by which one of multiple mobile devices is selected for receipt of communications based on activation priority is described as controlled by a service provider versus by the mobile devices or the user thereof. However, in other examples, selectively routing communications to one of multiple mobile devices, all of which are identified by a single mobile device number, may be controlled locally instead of remotely by a service provider. For example, with reference to example system 20 of FIG. 2, service provider 28 may always send communications associated with the one phone number to both of smart phone 22 and basic phone 24. However, the one of smart phone 22 and basic phone 24 with the lower activation priority may automatically disable itself from receiving the communications over network 26 from service provider 28 or from alerting the user to the communications, e.g. automatically switch off the phone ringer or any other communication alert mechanism. Smart phone 22 and basic phone 24 may coordinate local control of selective communication routing by a local direct communication link between the two phones, including, e.g., an infrared or Bluetooth connection.

In addition to the foregoing examples in which service provider 28 routes communications associated one phone number to the one of smart phone 22 and basic phone 24 with the highest activation priority, the phones may also be configured to synchronize data between one another. Synchronization between smart phone 22 and basic phone 24 may be accomplished via network 26, as well as a local communication medium, including, e.g. infrared communications, Bluetooth, or a wired connection, e.g. a Universal Serial Bus (USB) connection between the devices. Data synchronization between smart phone 22 and basic phone 24 may function to maintain data consistency between the different mobile phones such that changes made to data on one phone are transmitted to and resolved with data on the other phone employed by a user. For example, smart phone 22 and basic phone 24 may be configured to synchronize contacts, calendar, text messaging, e-mail, voice mail, and/or phone call data between one another. Because smart phone 22 and basic phone 24 may include different capabilities, e.g. processing and/or memory capacity, data synchronization between the phones may be based on, e.g., memory capacity, processing power, or display capabilities of each of the mobile devices.

In one example, the user of smart phone 22 and basic phone 24 employs the basic phone as a back-up when the battery of the smart phone becomes depleted or exhausted. In such an example, smart phone 22 may be configured to automatically or at the request of the user synchronize, e.g., contacts from an address book stored in memory of the smart phone with contacts stored on basic phone 24. For example, smart phone 22 may automatically synchronize contacts with basic phone 24 when the battery life of the battery of the smart phone falls below a threshold indicating that the phone will soon need to be recharged. In another example, smart phone 22 may issue an alert to the user when the battery life of the battery of the smart phone falls below a threshold indicating that the phone will soon need to be recharged, at which point the user may instruct the smart phone to synchronize data with basic phone 24 before the battery of the smart phone becomes exhausted.

Because smart phone 22 has a greater number and more advanced features, e.g. more advanced display, more memory, faster processor, and the like, the data synchronized with basic phone 24 may be truncated or otherwise modified to accommodate the relatively limited capabilities of the basic phone. For example, smart phone 22 may include contact records that store the name, multiple phone numbers, e.g. home, work, mobile, etc., the address, multiple e-mail addresses, as well as a picture of the contact. However, the contact records in basic phone 24 may only include a subset of this information, including, e.g., name and one phone number. As such, smart phone 22 may be configured to automatically truncate the contact information before synchronizing it with basic phone 24.

In another example including data synchronization between smart phone 22 and basic phone 24, the user employs basic phone as a loaner for another user. For example, a parent may loan basic phone 24 to a child for a limited period of time, e.g. a weekend vacation. In such an example, smart phone 22 and basic phone 24 may synchronize data between one another before and after the parent loans the basic phone to the child. As described above, the parent may own both smart phone 22 and basic phone 24, which are both identified by the same phone number. The parent may wish to allow a child to use to use a mobile phone for a limited period of time, e.g. for a weekend vacation away from home. However, the parent may not wish to allow the child to use the more expensive and feature rich smart phone 22. As such, the parent may turn off smart phone 22, thereby deregistering the phone from network 26, or change the activation priority of the smart phone and loan basic phone 24 to the child for the weekend. Over the weekend, the parent may receive text messages and phone calls, which are routed over network 26 to basic phone 24 by service provider 28. The child may simply ignore these communications, as they are directed to the parent and as, e.g., the child is only using basic phone 24 to call home or for emergencies. When the child returns from vacation, basic phone 24 may synchronize data with smart phone 22, including, e.g., call and text message logs, as well as voice and text messages received over the weekend.

Figure 3:
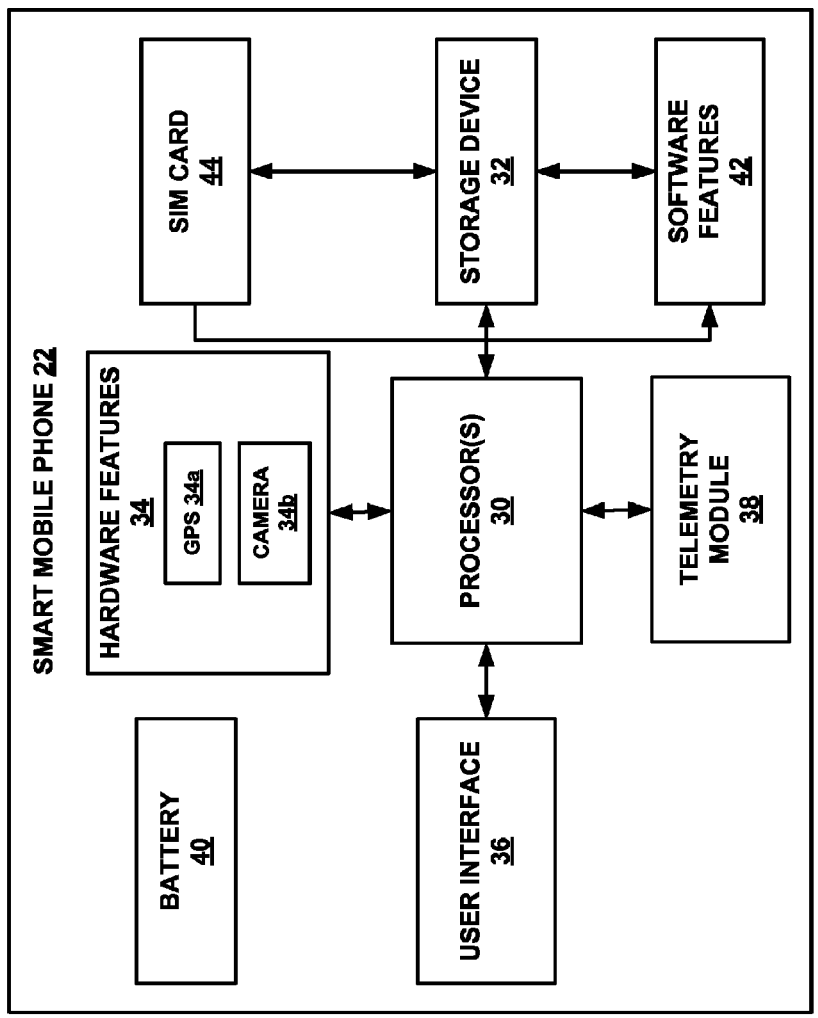
FIG. 3 is a block diagram illustrating an example smart mobile phone of the system of FIG. 2.

FIG. 3 is a block diagram illustrating an example of smart phone 22 including processor 30, storage device 32, hardware features 34, user interface 36, telemetry module 38, battery 40, software features 42, and Subscriber Identity Module (SIM) card 44. Processor 30, generally speaking, is communicatively connected to and controls operation of storage device 32, hardware features 34, user interface 36, telemetry module 38, and software features 42, all of which are powered by rechargeable battery 40. Processor 30 may include any one or more of a microprocessor, a controller, a digital signal processor (DSP), an application specific integrated circuit (ASIC), a field-programmable gate array (FPGA), or equivalent discrete or integrated logic circuitry. The functions attributed to processor 30 in this disclosure may be embodied as software, firmware, hardware and combinations thereof. Although smart phone 22 of FIG. 3 is illustrated as including one processor 30, other example mobile devices according to this disclosure may include multiple processors that are configured to execute one or more functions attributed to processor 30 of smart phone 22 individually or in different cooperative combinations.

Storage device 32 stores instructions for applications that may be executed by processor 30 and data used in such applications or collected and stored for use outside of smart phone 22, e.g. synchronization with basic phone 24. Storage device 32 may be a computer-readable, machine-readable, or processor-readable storage medium that comprises instructions that cause one or more processors, e.g., processor 30, to perform various functions. Storage device 32 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Generally speaking, storage device 32 may include instructions that cause processor 30 to perform various functions attributed to the processor in the disclosed examples.

Generally speaking, storage device 32 includes memory that stores software that may be executed by processor 30 to perform various functions for a user of smart phone 22, including, e.g., making and receiving cellular telephone calls or other communications like text or e-mail messages, using various software applications, and browsing the Internet. The software included in, e.g., software features 42 of smart phone 22 generally includes telemetry and other hardware drivers for the mobile phone, operating system software, and applications software. The operating system software of smart phone 22 may be, e.g. Linux software or another UNIX based system software, including, e.g., Google's Android. In another example, smart phone 22 may include proprietary operating system software not based on an open source platform like UNIX, including, e.g., Apple's iOS. Smart phone 22 may also include various applications included in software features 42 and executed by processor 30, including, e.g., web browser, calendar, contact management, e-mail applications, Global Positioning System (GPS), mapping applications, as well as various types of third-party vendor applications bundled with the device. As noted above, the applications included in software features 42 of smart phone 22 may be greater in number and include greater or more advanced functionality than the software features of basic phone 24.

Smart phone 22 includes hardware features 34. Hardware features 34 may include various hardware devices or features of smart phone 22, including, e.g., a large electronic display for displaying color graphics and text to users, a full QWERTY keyboard, touchpad, roller ball, scroll wheel, a microphone and speaker for voice communication, computer readable storage memory expansion slots, and the like. In example smart phone 22 of FIG. 3, hardware features 34 includes GPS 34a and digital camera 34b. In one example, hardware features 34 of smart phone 22 includes a display, which may be, e.g., a liquid crystal display (LCD), light emitting diode (LED) display, e-ink, or other display. The display of smart phone 22 presents content of smart phone 22 to a user. For example, the display may present the applications executed on smart phone 22, such as a web browser or a video game, as well as information about the phone, including, e.g., battery life and/or network signal strength. In one example, the display included in hardware features 34 of smart phone 22 may provide some or all of the functionality of user interface 36. For example, the display may be a large touch screen that allows the user to interact with smart phone 22. In generally, however, user interface 36 allows a user of smart phone 22 to interact with the phone via one or more input mechanisms, including, e.g., an embedded keypad, a keyboard, a mouse, a roller ball, buttons, scroll wheel, touch pad, touch screen, or other devices or mechanisms that allow the user to interact with the device.

In some examples, user interface 36 may include a microphone to allow a user to provide voice commands. Users may interact with user interface 36 and/or the display of smart phone 22 to execute one or more of the applications stored on storage device 32. Some applications may be executed automatically by smart phone 22, such as when the device is turned on or booted up. Processor 30 executes the one or more applications selected by a user, or automatically executed by smart phone 22.

Operation of smart phone 22 may require, for various reasons, receiving data from one or more sources, as well as transmitting data from the mobile device, including, e.g., data and voice communications routed over network 26 by service provider 28. Data and other communications to and from smart phone 22 may be handled by telemetry module 38. Telemetry module 38 is configured to transmit data/requests to and receive data/responses from one or more external sources via network 28. Telemetry module 38 may support various wireless communication techniques and protocols, and includes appropriate hardware and software to provide such communications. For example, telemetry module 38 may include an antenna, modulators, demodulators, amplifiers, and other circuitry to effectuate communication between smart phone 22 and service provider 28 via network 26. In one example, telemetry module 38 supports local communications between smart phone 22 and basic phone 24, e.g., via an infrared or Bluetooth connection between the two phones. Such local telemetry may be employed to, e.g., synchronize data between smart phone 22 and basic phone 24.

Battery 40 provides power for all of the various components of smart phone 22, and may be rechargeable. Examples of battery 40 include a lithium polymer battery, a lithium ion battery, nickel cadmium battery, and a nickel metal hydride battery. The life of battery 40 of smart phone 22 depends on many factors. For example, the life of battery 40 is affected by loads on the battery caused by the character and amount of use of the applications included in software features 34 and/or the components included in hardware features 42 of smart phone 22. As different components of smart phone 22, both different hardware and different software components, draw different amounts of power, the load on battery 40 may vary according to component usage patterns. Smart phone 22 may not only include additional and/or more advanced software features 42 and/or hardware features 34 than basic phone 24, users of the smart phone may also use the features more often, compounding the rate at which the life of battery 40 is depleted. For example, a backlight for a large, high resolution display included in hardware features 34 of smart phone 22 may draw more power than a basic LCD display included in basic phone 24 such that the life of battery 40 of smart phone 22 may decrease faster than the life of the battery of the basic phone.

In the example of FIG. 3, smart phone 22 also includes SIM card 44. SIM card 44 may include one or more integrated circuits, which generally function to process as well as store digital information. For example, SIM card 44 may be the mechanism by which smart phone 22 is identified by a phone number, the same phone number by which basic phone 24 is identified. Additionally, SIM card 44 may store and manage the activation priority of smart phone 22. The function and relevance of SIM card 44 in example smart phone 22 of FIG. 3 will be described in greater detail below with reference to a corresponding SIM card included in one example of basic phone 24.

Figure 4:
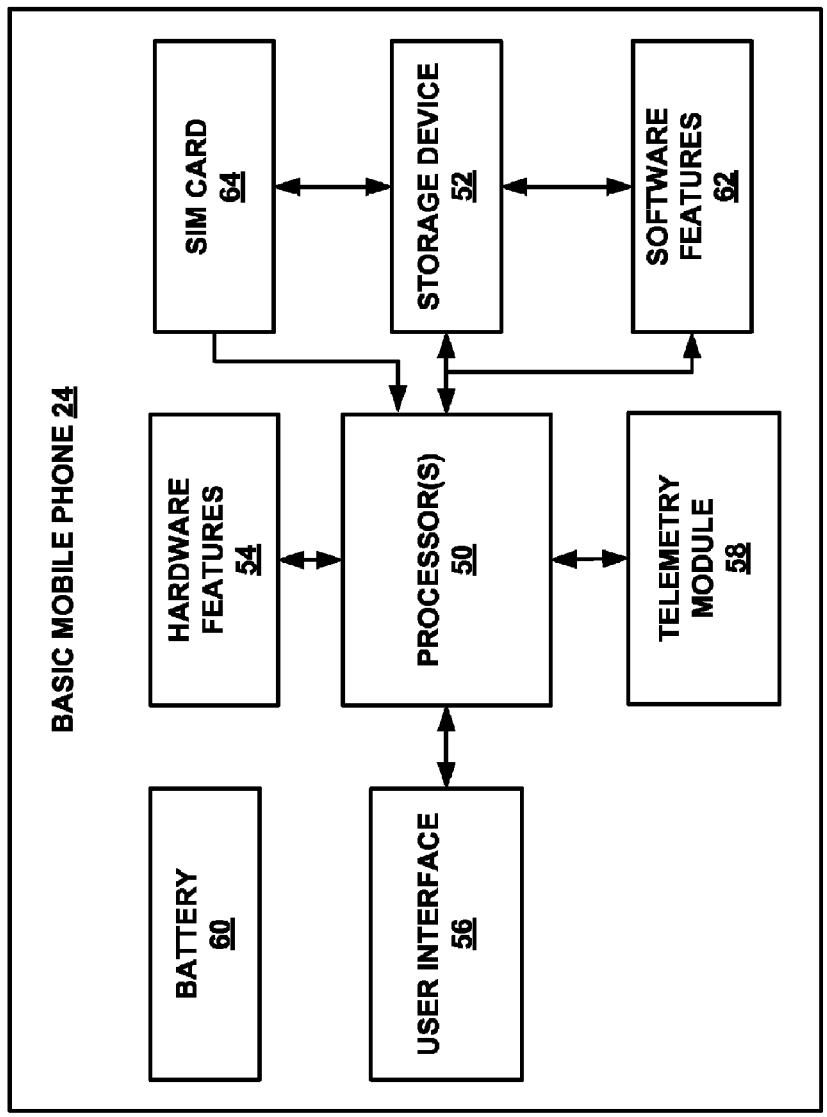
FIG. 4 is a block diagram illustrating an example basic mobile phone of the system of FIG. 2.

FIG. 4 is a block diagram illustrating an example of basic phone 24 including processor 50, storage device 52, hardware features 54, user interface 56, telemetry module 58, battery 60, software features 62, and Subscriber Identity Module (SIM) card 64. The configuration and functions of the components of basic phone 24 may be similar to the components of smart phone 22. For example, the type and function of processor 50 of basic phone 24 may be similar to processor 30 of smart phone 22. Additionally, as with smart phone 22, processor 50 of basic phone 24, generally speaking, may be communicatively connected to and control operation of storage device 52, hardware features 54, user interface 56, telemetry module 58, and software features 62, all of which are powered by rechargeable battery 60 of the basic phone. However, as noted above, the number and sophistication of the features of smart phone 22 may be greater than the features of basic phone 24. For example, although processor 50 of basic phone 24 may be the same type as processor 30 of smart phone 22, e.g. digital signal processor (DSP), processor 30 of smart phone 22 may be faster and more powerful than processor 50 of basic phone 24. Similarly, although storage device 52 of basic phone 24 may be the same type as storage device 32 of smart phone 22, e.g. non-volatile RAM (NVRAM), storage device 32 of smart phone 22 may have greater storage capacity and faster read/write speeds than storage device 52 of basic phone 24.

In addition to the foregoing distinctions between smart phone 22 and basic phone 24, the number and complexity of the components included in hardware features 54 and applications included in software features 62 of basic phone 24 may be less than the corresponding hardware features 34 and software features 42 of smart phone 22. For example, basic phone may include only a black and white, low resolution LCD display, which does not have any touch-screen capabilities. In one example, hardware features 54 of basic phone 24 may not include any additional hardware components, like GPS 34a, camera 34b or a QWERTY keyboard. Similarly, in one example, software features 62 of basic phone 24 may not include any advanced applications, like web browsers, e-mail, or GPS.

In the example of FIG. 4, basic phone 24, like smart phone 22, includes SIM card 64. SIM card 64 may include one or more integrated circuits, which generally function to process as well as store digital information. For example, SIM card 64 of basic phone 24 may be the mechanism by which the phone is identified by a phone number, the same phone number by which smart phone 22 is identified. Additionally, SIM card 64 may store and manage the activation priority of basic phone 24.

Although the function of example smart phone 22 of FIG. 3 and example basic phone 24 of FIG. 4 together by one or more users is described below with reference to the use of SIM cards, in other examples, the phones may employ alternative mechanisms to be identified by a single phone number and to include an activation priority. For example, storage device 32 of smart phone 22 and storage device 52 of basic phone 24 may be employed for such functions. One advantage of the use of SIM card 44 of smart phone 22 and SIM card 64 of basic phone 24 is the portability of the cards to additional phones a user may require, e.g. to replace a damaged phone, or desire, e.g. to add another phone with an additional level of features like a mid-range phone. SIM cards may be configured to securely store keys, e.g. phone number, IMSI, or other mobile device number used to identify a subscriber on a mobile phone, as well as to allow users to change phones by removing the SIM card from one mobile phone and inserting it into another mobile phone or other mobile device. For example, SIM cards 44 and 64 may be employed by service provider 28 communicating over network 26 to identify smart phone 22 and basic phone 24, respectively, by the same mobile phone number.

Referring the examples of FIGS. 3 and 4, in one example, smart phone 22 and basic phone 24 are registered on network 26 by service provider 28 in order to communicate over the network. Service provider 28 may, e.g., register each of smart phone 22 and basic phone 24 on network 26 by, among other criteria, identifying the phones by one phone number. For example, service provider 28 may communicate with smart phone 22 and basic phone 24 over network 26 and may register the phones by identifying them by the phone number stored on SIM cards 44 and 64, respectively included in each of the phones. In examples according to this disclosure, the one phone number stored on SIM cards 44 and 64 by which service provider 28 identifies both smart phone 22 and basic phone 24, respectively, defines an address at which communications are routed to the one of the smart or basic phone having the highest activation priority without being routed to an intervening address defined by another device number.

Each of smart phone 22 and basic phone 24 includes an activation priority. Activation priority refers to a number, letter, alphanumeric, or other code that indicates the priority with which a particular one of multiple mobile devices should be activated for communications on a mobile device network. In example system 20 of FIG. 2, the activation priorities of smart phone 22 and basic phone 24 indicate the priority with which communications associated with one phone number should be routed to one of the phones on network 26 by service provider 28. In one example, the activation priorities of smart phone 22 and basic phone 24 may be stored on and managed by SIM cards 44 and 64, respectively included in each of the phones.

In one example, SIM card 44 of smart phone 22 stores an activation priority for the smart phone equal to 1 and SIM card 64 of basic phone 24 stores an activation priority equal to 2 for the basic phone, where a lower number corresponds to a higher priority such that the highest possible activation priority equals 1. In another example, a lower number may correspond to a lower priority such that the lowest possible activation priority may equal 1. In any event, service provider 28 may selectively route communications to the one of smart phone 22 and basic phone 24 registered on network 26 with the highest activation priority. As such, although both smart phone 22 and basic phone 24 are identified by one phone number stored on SIM cards 44 and 64, respectively, service provider 28 selectively routes communications to only one of the phones by discriminating between the phones based on activation priority.

In the example of FIG. 2, both smart phone 22 and basic phone 24 are registered on network 26 by service provider 28, as indicated by both the solid and dashed communication lines in FIG. 1. However, service provider 28 routes communications over network 26 only to smart phone 22, as indicated by the solid communication line between smart phone 22 and network 26, because smart phone 22 includes the highest activation priority of the phones registered on network 26.

In another example, smart phone 22 is not registered on or becomes deregistered from network 26 for some reason, e.g. because the battery life of a battery of the smart phone is depleted or exhausted or because a user powers the phone off. In this example, service provider 28 may thereafter route communications associated with the phone number to basic phone 24, which includes the highest activation priority of smart phone 22 and basic phone 24 still registered on network 26.

In addition to the foregoing examples in which service provider 28 routes communications associated with one phone number to the one of smart phone 22 and basic phone 24 with the highest activation priority, the smart and basic phones may also be configured to synchronize data between one another, e.g., as described above with reference to system 20 of FIG. 2.

Figure 5:
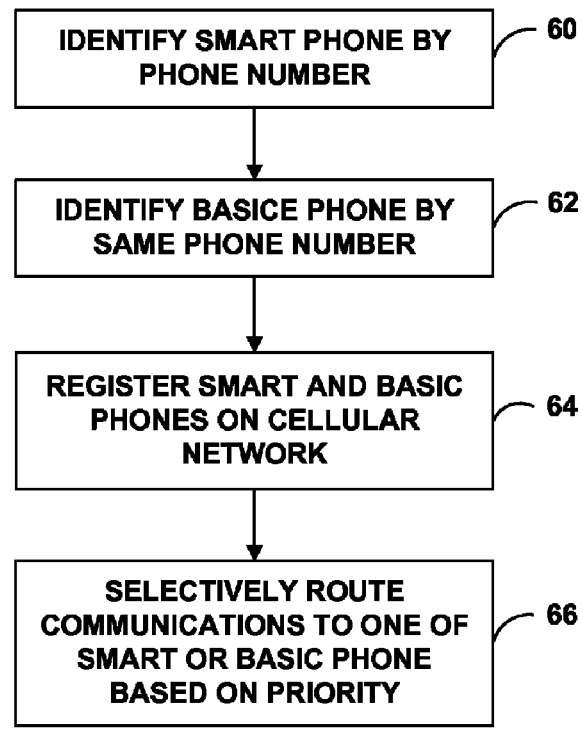
FIG. 5 is a flowchart illustrating an example method of selectively routing communications over a network to one of multiple mobile devices.

FIG. 5 is a flowchart illustrating an example method including identifying a smart phone by a phone number (60), identifying a basic phone by the same phone number as the smart phone (62), optionally, registering the smart phone and the basic phone on a cellular telephone network (64), and selectively routing communications to one of the smart phone or the basic phone based on an activation priority of each of the phones (66). The functions of the method of FIG. 5 are described below as carried out by various components of example system 20 of FIG. 2 for purposes of illustration only. In other examples, one or more of the functions of the method of FIG. 5 may be carried out by other devices or systems that differ from system 20 in constitution and arrangement. For example, instead of system 20 including smart phone 22 and basic phone 24, the functions of the method of FIG. 5 may be carried out in system 10 including a plurality of mobile devices 12A-12N.

The method of FIG. 5 includes identifying a smart phone by a phone number (60), identifying a basic phone by the same phone number (62), and, optionally, registering the smart phone and the basic phone on a cellular telephone network (64). In one example, smart phone 22 includes SIM card 44 and basic phone 24 includes SIM card 64. SIM cards 44 and 64 may include one or more integrated circuits, which generally function to process as well as store digital information. For example, SIM cards 44 and 64 of smart phone 22 and basic phone 24, respectively, may be the mechanism by which the phones are identified by the same phone number. In another example, smart phone 22 and/or basic phone 24 may employ alternative mechanisms to be identified by a single phone number. For example, storage device 32 of smart phone 22 and storage device 52 of basic phone 24 may be employed for such functions.

Whatever mechanism is employed to identify smart phone 22 and basic phone 24 by the same phone number, in one example, smart phone 22 and basic phone 24 may be registered on network 26 by service provider 28 in order to communicate over the network. Service provider 28 may, e.g., register each of smart phone 22 and basic phone 24 on network 26 by, among other criteria, identifying the phones by one phone number. For example, service provider 28 may communicate with smart phone 22 and basic phone 24 over network 26 and may register the phones by identifying them by the phone number stored on SIM cards 44 and 64, respectively included in each of the phones. The one phone number stored on SIM cards 44 and 64 by which service provider 28 identifies both smart phone 22 and basic phone 24, respectively, defines an address at which communications are routed to the one of the smart or basic phone having the highest activation priority without being routed to an intervening address defined by another device number.

The method of FIG. 5 also includes selectively routing communications to one of the smart phone or the basic phone based on an activation priority of each of the phones (66). In addition to the phone number by which smart phone 22 and basic phone 24 are identified, SIM cards 44 and 64 of smart phone 22 and basic phone 24, respectively, may store and manage the respective activation priorities of the two phones. In one example, each of smart phone 22 and basic phone 24 includes an activation priority. Activation priority refers to a number, letter, alphanumeric, or other code that indicates the priority with which a particular one of multiple mobile devices should be activated for communications on a mobile device network. In example system 20 of FIG. 2, the activation priorities of smart phone 22 and basic phone 24 indicate the priority with which communications associated with one phone number should be routed to one of the phones on network 26 by service provider 28. In one example, the activation priorities of smart phone 22 and basic phone 24 may be stored on and managed by SIM cards 44 and 64, respectively included in each of the phones.

In one example, SIM card 44 of smart phone 22 stores an activation priority for the smart phone equal to 1 and SIM card 64 of basic phone 24 stores an activation priority equal to 2 for the basic phone, where a lower number corresponds to a higher priority such that the highest possible activation priority equals 1. In another example, a lower number may correspond to a lower priority such that the lowest possible activation priority may equal 1. In any event, service provider 28 may selectively route communications to the one of smart phone 22 and basic phone 24 registered on network 26 with the highest activation priority. As such, although both smart phone 22 and basic phone 24 are identified by one phone number stored on SIM cards 44 and 64, respectively, service provider 28 selectively routes communications to only one of the phones by discriminating between the phones based on activation priority.

In one example of the method of FIG. 5, both smart phone 22 and basic phone 24 are registered on network 26 by service provider 28. However, service provider 28 routes communications over network 26 only to smart phone 22, because smart phone 22 includes the highest activation priority of the phones registered on network 26. In another example, smart phone 22 is not registered on or becomes deregistered from network 26 for some reason, e.g. because the battery life of a battery of the smart phone is depleted or exhausted or because a user powers the phone off. In this example, service provider 28 may thereafter route communications associated with the phone number to basic phone 24, which includes the highest activation priority of smart phone 22 and basic phone 24 still registered on network 26.

In one example of the method of FIG. 5, service provider 28 may permit both smart phone 22 and basic phone 24 to transmit outgoing communications regardless of activation priority. For example, service provider 28 may permit both smart phone 22 and basic phone 24, registered on network 26 to make outgoing phone calls regardless of the activation priority of each phone. In such an example, when an outgoing call is made by a phone that does not have the highest activation priority of the phones registered on network 26, e.g. basic phone 24 in the example of FIG. 2, the caller identification may still identify itself as the phone number by which both smart phone 22 and basic phone 24 are identified. Additionally, for the duration of the outgoing call by basic phone 24, service provider 28 may behave as if smart phone 22 is deregistered from network 26. In other words, for the duration of the outgoing call by basic phone 24, if an incoming call is received, service provider 28 may route the call to basic phone 24 instead of smart phone 22.

In addition to the foregoing functions, the method of FIG. 5 may include synchronizing data between smart phone 22 and basic phone 24. Synchronization between smart phone 22 and basic phone 24 may be accomplished via network 26, as well as a local communication medium, including, e.g. infrared communications, Bluetooth, or a wired connection, e.g. a Universal Serial Bus (USB) connection between the devices. Data synchronization between smart phone 22 and basic phone 24 may function to maintain data consistency between the different mobile phones such that changes made to data on one phone are transmitted to and resolved with data on the other phone employed by a user. For example, smart phone 22 and basic phone 24 may be configured to synchronize contacts, calendar, text messaging, e-mail, voice mail, and/or phone call data between one another. Because smart phone 22 and basic phone 24 may include different capabilities, e.g. processing and/or memory capacity, data synchronization between the phones may be based on, e.g., memory capacity, processing power, or display capabilities of each of the mobile devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
   identifying, by a computing device comprising a processor and memory, a first mobile phone and a second mobile phone by one telephone number, wherein each of the first and the second mobile phones is associated with an activation priority that indicates a priority with which the respective mobile phone is activated for communications on a network, and wherein the first mobile phone is associated with a first activation priority that is higher than a second activation priority associated with the second mobile phone;
   changing the second activation priority to be higher than the first activation priority such that the second activation priority associated with the second mobile phone indicates that the second mobile phone is activated for communications on the network with a higher priority than the first mobile phone;
   selectively routing communications associated with the one telephone number to the second mobile phone having the second activation priority, wherein the one telephone number defines an address at which the communications are routed to one of the first and the second mobile phones having the highest activation priority without being routed to an intervening address defined by another telephone number; and
   generating a notification message on the first mobile phone when communications are routed to the second mobile phone.

2. The method of claim 1, further comprising registering one or more of the first and the second mobile phones on a mobile device network, wherein selectively routing communications associated with the one device telephone number to the second mobile phone having the second activation priority comprises selectively routing communications associated with the telephone number to one of the first and the second mobile phones registered on the network and having the highest activation priority.

3. The method of claim 2, wherein the first mobile phone registered on the network comprises a smart mobile phone and the second mobile phone registered on the network comprises a basic mobile phone.

4. The method of claim 3, further comprising deregistering the smart phone from the network when the battery life of a battery of the smart phone falls below a threshold.

5. The method of claim 2, further comprising deregistering one of the first and the second mobile phones after the phone has not communicated with the mobile device network within a network timeout limit.

6. The method of claim 1, further comprising synchronizing data between the first and the second mobile phones.

7. The method of claim 6, wherein synchronizing data comprises synchronizing at least one of contacts, calendar, text messaging, e-mail, voice mail, or phone call data between the first and the second mobile phones.

8. The method of claim 6, wherein synchronizing data comprises synchronizing data between the first and the second mobile phones based on at least one of memory capacity, processing power, or display capabilities of each of the first and the second mobile phones.

9. The method of claim 6, wherein synchronizing data comprises synchronizing data between the first and the second mobile phones over at least one of a cellular network or a local wireless connection.

10. A tangible computer-readable storage medium comprising instructions for causing a programmable processor to:
    identify a first mobile phone and a second mobile phone with one telephone number, wherein each of the first and the second mobile phones is associated with an activation priority that indicates a priority with which the respective mobile phone is activated for communications on a network, and wherein the first mobile phone is associated with a first activation priority that is higher than a second activation priority associated with the second mobile phone;
    change the second activation priority to be higher than the first activation priority such that the second activation priority associated with the second mobile phone indicates that the second mobile phone is activated for communications on the network with a higher priority than the first mobile phone;
    selectively route communications associated with the one telephone number to the second mobile phone having the second activation priority, wherein the one telephone number defines an address at which the communications are routed to one of the first and the second mobile phones having the highest activation priority without being routed to an intervening address defined by another telephone number; and
    generate a notification message on the first mobile phone when communications are routed to the second mobile phone.

11. The tangible computer-readable storage medium of claim 10 further comprising instructions for causing a programmable processor to register one or more of the first and the second mobile phones on a mobile device network, and wherein the processor selectively routing communications associated with the one telephone number to the second mobile phone having the second activation priority comprises selectively routing communications associated with the telephone number to one of the first and the second mobile phones registered on the network and having the highest activation priority.

12. The tangible computer-readable storage medium of claim 11, wherein the first mobile phone registered on the network comprises a smart mobile phone and the second mobile phone registered on the network comprises a basic mobile phone.

13. The tangible computer-readable storage medium of claim 12, wherein the smart mobile phone comprises a battery and the computer-readable storage medium comprises instructions for causing the programmable processor to deregister the smart mobile phone from the network when the battery life of the battery falls below a threshold.

14. The tangible computer-readable storage medium of claim 10 further comprising instructions for causing a programmable processor to synchronize data between the first and the second mobile phones.

15. The tangible computer-readable storage medium of claim 14, wherein synchronizing data comprises synchronizing at least one of contacts, calendar, text messaging, e-mail, voice mail, or phone call data between the first and the second mobile phones.

16. The tangible computer-readable storage medium of claim 14, wherein synchronizing data comprises synchronizing data between the first and the second mobile phones based on at least one of memory capacity, processing power, or display capabilities of each of the first and the second mobile phones.

17. A system comprising:
a processor; and
a computer-readable storage medium storing instructions for causing the processor to:
identify a first mobile phone and a second mobile phone with one telephone number, wherein each of the first and the second mobile phones is associated with an activation priority that indicates a priority with which the respective mobile device phone is activated for communications on a network, and wherein the first mobile phone is associated with a first activation priority that is higher than a second activation priority associated with the second mobile phone;
change the second activation priority to be higher than the first activation priority such that the second activation priority associated with the second mobile phone indicates that the second mobile phone is activated for communications on the network with a higher priority than the first mobile phone;
selectively route communications associated with the one telephone number to the second mobile phone having the second activation priority, wherein the one telephone number defines an address at which the communications are routed to one of the first and the second mobile phones having the highest activation priority without being routed to an intervening address defined by another telephone number; and
generate a notification message on the first mobile phone when communications are routed to the second mobile phone.

* * * * *